(12) United States Patent
Hatcher, II et al.

(10) Patent No.: US 9,251,396 B2
(45) Date of Patent: Feb. 2, 2016

(54) TOUCHLESS FINGERPRINTING ACQUISITION AND PROCESSING APPLICATION FOR MOBILE DEVICES

(71) Applicant: Diamond Fortress Technologies, Inc., Birmingham, AL (US)

(72) Inventors: Charles W. Hatcher, II, Trussville, AL (US); Ryan R. Butler, Moody, AL (US); William C. Lucas, Decatur, AL (US); Howard Christopher Brakefield, Mountain Brook, AL (US)

(73) Assignee: Diamond Fortress Technologies, Inc., Birmingham, AL (US)

( * ) Notice: Subject to any disclaimer, the term of this patent is extended or adjusted under 35 U.S.C. 154(b) by 0 days.

(21) Appl. No.: 14/164,974

(22) Filed: Jan. 27, 2014

(65) Prior Publication Data
US 2014/0212008 A1    Jul. 31, 2014

Related U.S. Application Data

(60) Provisional application No. 61/758,012, filed on Jan. 29, 2013.

(51) Int. Cl.
*G06K 9/00* (2006.01)
*G06K 9/22* (2006.01)

(52) U.S. Cl.
CPC .............. *G06K 9/00033* (2013.01); *G06K 9/22* (2013.01)

(58) Field of Classification Search
CPC ............ G06K 9/0002; G06K 9/00033; G06K 9/00019; G06K 9/00026; G06K 9/00084; G06K 9/00065; G06K 9/00017; G06K 9/4609; G06T 7/0083; G06T 2207/10016; G11B 27/28
See application file for complete search history.

(56) References Cited

U.S. PATENT DOCUMENTS

| 5,259,025 A | 11/1993 | Monroe et al. |
| 5,321,765 A | 6/1994 | Costello |
| 5,477,294 A | 12/1995 | Kato et al. |
| 5,828,773 A | 10/1998 | Setlak et al. |
| 5,978,519 A | 11/1999 | Bollman et al. |

(Continued)

FOREIGN PATENT DOCUMENTS

| EP | 0901280 | 3/1999 |
| EP | 2299693 | 3/2011 |

(Continued)

OTHER PUBLICATIONS

Korean Intellectual Property Office, International Search Report and Written Opinion; May 7, 2014; (11 pages); Daejeon, South Korea.

(Continued)

*Primary Examiner* — Amir Alavi
(74) *Attorney, Agent, or Firm* — Emerson Thomson Bennett, LLC; Roger D. Emerson; Sergey Vernyuk

(57) ABSTRACT

This disclosure is of a biometric authentication system and method. The system includes a mobile device having a camera and a screen, and a database. The system is programmed to superimpose on the screen an overlay of a finger over a real-time image seen by the camera, capture an image of a fingerprint of a user with the camera, compare the captured image with an authenticated fingerprint image that is stored in the database, and return a positive result if the compared images match.

9 Claims, 5 Drawing Sheets

(56) References Cited

U.S. PATENT DOCUMENTS

| | | | |
|---|---|---|---|
| 5,994,844 A | 11/1999 | Crawford et al. | |
| 7,676,068 B2* | 3/2010 | Cervantes | 382/115 |
| 7,685,629 B1* | 3/2010 | White et al. | 726/2 |
| 8,312,291 B2 | 11/2012 | Golic et al. | |
| 8,401,875 B2* | 3/2013 | Fish et al. | 705/3 |
| 8,406,421 B2* | 3/2013 | Kamen et al. | 380/28 |
| 8,806,586 B2* | 8/2014 | Ehrensvard et al. | 726/5 |
| 8,874,754 B2* | 10/2014 | Salinca et al. | 709/226 |
| 8,881,251 B1* | 11/2014 | Hilger | 726/7 |
| 9,049,191 B2* | 6/2015 | Inatomi et al. | 1/1 |
| 2002/0150282 A1 | 10/2002 | Kinsella | |
| 2004/0148509 A1 | 7/2004 | Wu | |
| 2004/0234111 A1 | 11/2004 | Mueller | |
| 2005/0024517 A1 | 2/2005 | Luciano | |
| 2006/0008129 A1 | 1/2006 | Lee et al. | |
| 2006/0022816 A1 | 2/2006 | Yukawa | |
| 2008/0037833 A1 | 2/2008 | Takahashi et al. | |
| 2008/0101664 A1 | 5/2008 | Perez | |
| 2012/0086794 A1 | 4/2012 | Burcham et al. | |
| 2012/0314911 A1 | 12/2012 | Paul et al. | |
| 2014/0212008 A1* | 7/2014 | Hatcher et al. | 382/124 |

FOREIGN PATENT DOCUMENTS

| | | |
|---|---|---|
| EP | 2388734 | 11/2011 |
| JP | 2001-273498 | 10/2001 |
| KR | 10-2005-0021637 | 3/2005 |
| WO | 2012-064870 | 5/2012 |

OTHER PUBLICATIONS (Author Unknown); Grayscale Camera Screenshots; DownloadAtoZ; Oct. 18, 2011; 5 pages; published on Internet—http://app.downloadatoz.com/iphone/grayscale-camera/screenshots.html.

(Author Unknown); AVCaptureDevice Class Reference; Dec. 13, 2012; pp. 16-17 and 21; Apple Inc.; published on Internet—https://developer.apple.com/library/mac/documentation/AVFoundation/Reference/AVCaptureDevice_Class/AVCaptureDevice_Class.pdf.

* cited by examiner

US 9,251,396 B2

TOUCHLESS FINGERPRINTING ACQUISITION AND PROCESSING APPLICATION FOR MOBILE DEVICES

This application claims benefit of 61/758,012 Jan. 29, 2013.

I. BACKGROUND OF THE INVENTION

A. Field of Invention

This invention pertains to the art of biometric authentication and more specifically to a biometric system that uses a mobile device with a camera to capture a fingerprint image.

B. Description of the Related Art

U.S. Pat. Pub. No. 2012/0086794 discloses a contactless fingerprint acquisition and processing method that includes the steps of detecting and acquiring an object image, converting the object image into a fingerprint image and at least one of identifying and verifying the fingerprint image.

E.P.O. Pat. Pub. No. EP 2388734 discloses a photography subsystem configured to be operated in fingerprint scanning mode and a normal mode. An autofocus module may be initialized to control a lens with an initial focal length set according to received instructions indicating one of the modes of operation. An image signal processor associated with the photography subsystem may process images received from the photography subsystem and, if necessary, process the images to form a candidate digital fingerprint for use in an authentication process.

U.S. Pat. No. 5,828,773 discloses a fingerprint sensing device that includes a fingerprint sensor, a processor for determining an actual fingerprint position on the fingerprint sensor relative to a desired fingerprint position, and a finger position indicator for generating a finger position indication to assist the user in positioning the finger to the desired fingerprint position based upon the actual fingerprint position on the fingerprint sensor. The processor calculates a fingerprint center point defining the actual fingerprint position. The fingerprint sensor may be an electric field sensor in integrated circuit form. The finger position indicator may be a visual indicator, such as a position image indicia generator for generating image indicia on a display screen relating to the fingerprint position on the fingerprint sensor, and wherein an actual fingerprint position image is also generated relative to the position image indicia on the display screen. The position image indicia may be a desired fingerprint center point indicia image. Method steps of the design are also disclosed.

U.S. Pat. No. 8,312,291 discloses a biometric user authentication method that includes the steps of: enrolling a user based on user's biometric samples to generate user's reference data; and authenticating the user based on a user's live biometric sample and the user's reference data; wherein enrolling a user includes acquiring the user's biometric samples;

extracting an enrollment feature vector from each user's biometric sample; computing a biometric reference template vector as a mean vector based on the enrollment feature vectors; computing a variation vector based on the enrollment feature vectors and the mean vector; randomly generating an enrollment secret vector; computing an enrollment code vector based on the enrollment secret vector and the variation vector; computing a difference vector as a wrap-around difference between the enrollment code vector and the mean vector; computing an error correction vector based on the enrollment secret vector to enable error correction during the user authentication phase according to a given error tolerance level, wherein the error correction vector is not computed if the error tolerance level is equal to zero; and storing the variation vector, the difference vector, and the error correction vector as a part of the user's reference data to be used during the user authentication phase.

U.S. Pat. Pub. No. 2008/0101664 discloses a method of recognizing 3D fingerprints by contact-less optical means. The method comprises inter alia the steps of: obtaining an optical contact-less means for capturing fingerprints, such that 3D optical images, selected from a group comprising minutia, forks, endings or any combination thereof are provided; obtaining a plurality of fingerprints wherein the images resolution of said fingerprints is not dependent on the distance between a camera and said inspected finger; correcting the obtained images by mis-focal and blurring restoring; obtaining a plurality of images, preferably 6 to 9 images, in the enrolment phase, under various views and angles; systematically improving the quality of the field depth of said images and the intensity per pixel; and, disengaging higher resolution from memory consumption, such that no additional optical sensor is required.

II. SUMMARY

In accordance with one aspect of the present invention, a method for biometric authentication of a user includes the steps of: a) providing a mobile device including a camera and a screen, and a database; b) superimposing on the screen an overlay of a finger over a realtime image as currently seen through the camera; c) capturing with the camera an image of a fingerprint of the user; d) comparing the captured image with an authenticated fingerprint image that is stored in the database; and e) returning a positive result if the compared images match.

In accordance with another aspect of the present invention, a method for biometric authentication of a user includes the steps of: a) providing: a mobile device including a camera and a screen; a database; and a randomly-generated image that is unique to each user using the mobile device; b) capturing with the camera an image of a fingerprint of the user; c) extracting first significant geographical areas of the fingerprint image; d) extracting second significant geographical areas of the randomly-generated image; e) concatenating the first significant geographical areas with the second significant geographical areas to produce a concatenated string; f) comparing the concatenated string with an authenticated concatenated string that is stored in the database; and g) returning a positive result if the compared strings match.

In accordance with another aspect of the present invention, a biometric authentication system includes: a mobile device including a CCD or CMOS camera and a screen; and a database; wherein the system is programmed to: superimpose on the screen an overlay of a finger over a real-time image seen by the camera; capture an image of a fingerprint of a user with the camera; compare the captured image with an authenticated fingerprint image that is stored in the database; and return a positive result if the compared images match.

Still other benefits and advantages of the invention will become apparent to those skilled in the art to which it pertains upon a reading and understanding of the following detailed specification.

III. Brief Description of the Drawings

The invention may take physical form in certain parts and arrangement of parts, embodiments of which will be described in detail in this specification and illustrated in the accompanying drawings which form a part hereof and wherein.

IV. Detailed Description of the Invention

Figure 1:
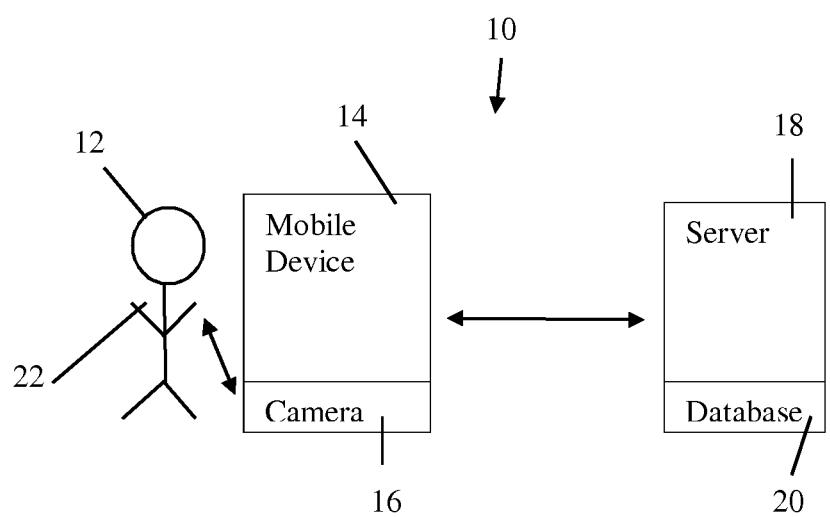
FIG. 1 is a diagram of a biometric system.

Referring now to the drawings wherein the showings are for purposes of illustrating embodiments of the invention only and not for purposes of limiting the same, and wherein like reference numerals are understood to refer to like components, FIG. 1 shows a diagram of a biometric system 10 according to an embodiment of this invention. This embodiment may include a user 12, a mobile device 14, and a server 18. The mobile device 14 may include a camera 16. The server 18 may include a database 20. In this embodiment, the user 12 may use the camera 16 of the mobile device 14 to capture an image 30 of the user's finger 22 that defines the fingerprint. The finger 22 that defines the fingerprint may but does not need to contact the mobile device 14 or the camera 16 to capture the image 30. The image 30 of the fingerprint may be transmitted to the server 18 where the image 30 may be compared to other images in the database 20 to determine whether the image 30 matches a database entry. The server 18 may communicate the results back to the mobile device 14. The comparison may be implemented by, for example, performing standard deviation analysis or other known techniques.

The mobile device 14 may include, but is not limited to, a cell phone, an MP3 player, a tablet PC, a laptop computer, or a personal digital assistant. In alternative embodiments of the invention, the software implementing the system 10 on the mobile device 14 may operate on Android, iOS, Windows 7, or Windows 8 operating systems. One of ordinary skill in the art would understand that the biometric system 10 may also be used with non-mobile devices that include a camera, for example a computer with a web-camera. One of ordinary skill in the art would also understand that the biometric system 10 may work with other biometric indicators of a user 12 other than fingerprints, including, but not limited to: face recognition, iris smays, palm prints, voice signatures, and/or signature comparison. The biometric system 10 may be used for, but is not limited to, unlocking the mobile device 14, accessing applications on the mobile device 14, or authentication of mobile payment systems.

One of ordinary skill in the art would understand that the server 18 may be a general purpose computer programmed with specific software to implement the method of this biometric system 10. Alternative embodiments of the system may use a special-purpose computer, a mini-computer, a mainframe computer, or a workstation. The server 18 may be a cloud-based network of computers. In another embodiment, the server 18 may be an HTTP web server. Communication between the mobile device 14 and server 18 may be by any method known to one of ordinary skill in the art, including, but not limited to, wired communication, LAN, Ethernet, USB, Firewire, wireless communication, WiFi, Bluetooth, RF, CDMA, TDMA, GSM, and/or infrared. In another embodiment of the invention, the database 20 may be stored on the mobile device 14, so that no external server 18 is required. In such an embodiment, all of the steps of FIG. 2 may be performed by the mobile device 14. In another embodiment, the database 20 may be a SQLite database.

Figure 2:
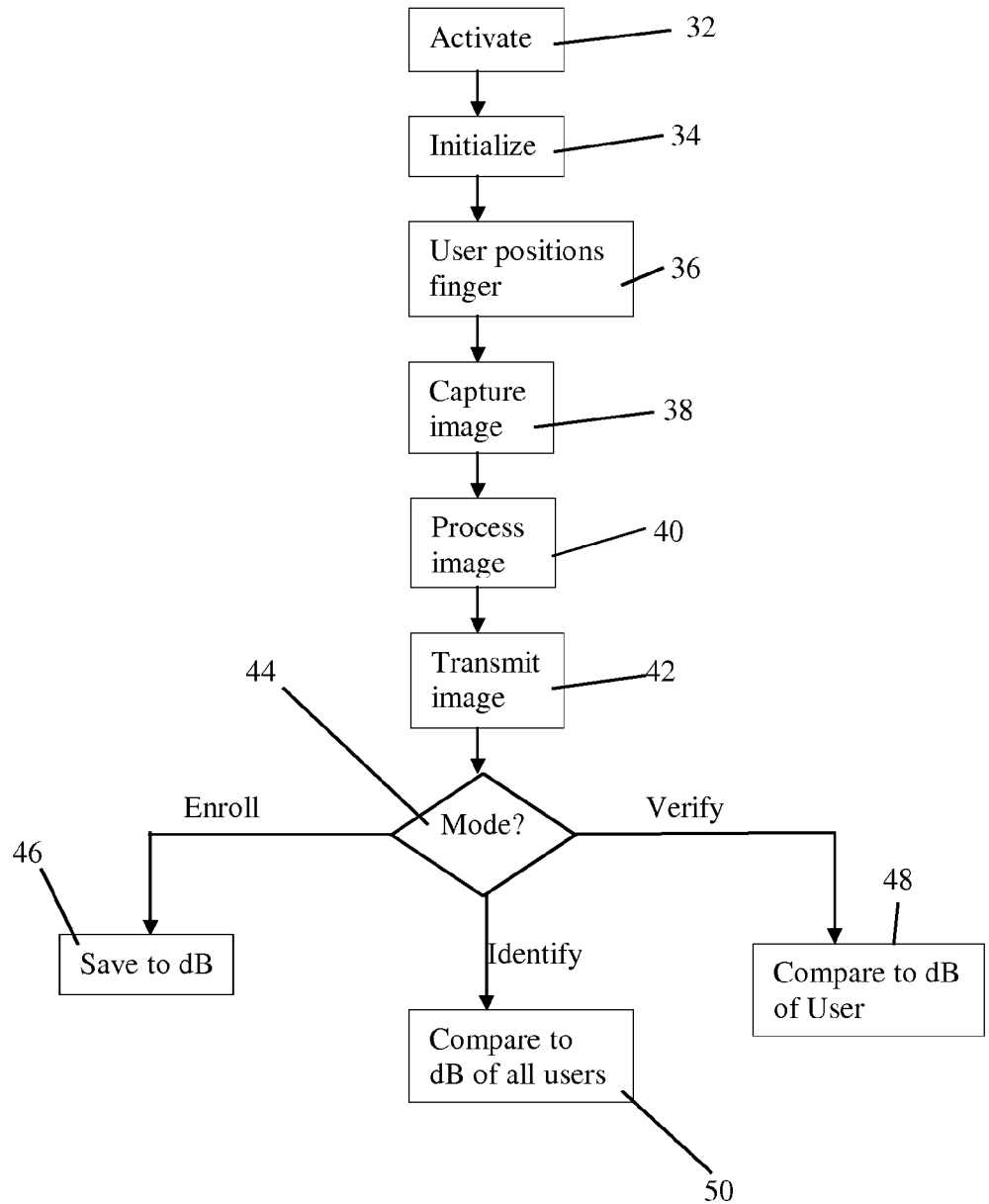
FIG. 2 is a flow chart of a biometric system method.

FIG. 2 shows a flow chart of one embodiment of a biometric system method. At block/step 32, the biometric system 10 may be activated. Such activation may occur on initiation by the user 12. Alternatively, such activation may occur when the mobile device 14 is powered on. Alternatively, such activation may be triggered by other software such as, but not limited to, a request for authentication by a mobile payment system.

At block/step 34, the system 10 may initialize. During such initialization, the mobile device 14 may turn on the camera 16 and prepare to capture an image. At this block/step 34, the system 10 may ask the user 12 to input the user's name or other identification. Alternatively, the system 10 may allow the user 12 to indicate that the user 12 is a new user and that enrollment of the user 12 is necessary. In such a case, the user 12 may input the user's name or other identification into the system 10. Alternatively, the system 10 may proceed without an existing enrolled user 12 inputting the user's name or other identification. Alternatively, the device 14 may remember the name or other identification of the last user 12 to have used the device 14 and assume that the same user 12 is now using the system 10.

At block/step 36, the user 12 may position the user's finger 22 before the camera 16. In another embodiment, the device 14 may automatically set the focal depth, exposure, and light level depending on the positioning of the user's finger 22 before the camera 16 and ambient conditions.

At block/step 38, the camera 16 may capture an image 30 of the user's finger 22. Such capture may be triggered automatically when the mobile device software indicates that a finger 22 is positioned in front of the camera 16. Alternatively, the capture may be triggered by the user 12 pressing a button on the device 14. It is understood to one of ordinary skill in the art that such a button may be a virtual or soft button. In another embodiment of the invention, the mobile device 14 may mask or black out the top third of the field of view of the camera 16 and/or the bottom third of the field of view of the camera 16 during block/step 36. If the user 12 positions the finger 22 horizontally in front of the camera 16, such masking will not prevent capturing the fingerprint image 30 but may reduce any background captured, may decrease the size of the captured image 30, and may increase transmission or processing times for the image 30.

At block/step 40, the captured image 30 may be processed. In various embodiments, such processing may include, but is not limited to, one or more of the following: converting the image 30 to a black and white image; cropping the top third of the image 30 and/or the bottom third of the image 30; reducing image noise; reducing any blurring of the image 30; enhancing ridge contours of the image 30; compressing the image 30; encrypting the image 30; and binarizing the fingerprint image 30. In another embodiment, at block/step 40, the captured image 30 may be analyzed to determine whether it is of sufficient quality for use in the system 10. If not, the user 12 may be prompted to again capture an image 30 of the user's fingerprint. In another embodiment, if processing is completed in a faster time than average, the system 10 may return a negative result; the underlying premise may be that an unauthorized person may have placed a two-dimensional photograph of a fingerprint before the camera 16, which may require less processing than for a three-dimensional real finger 22.

At block/step 42, the processed image may be transmitted for enrollment, verification, or identification. Such transmission may be to the server 18 if the database 20 is not on the mobile device 14, or such transmission may be internally within the device 14 to its database 20 if the database is stored on the device 14. In another embodiment of the invention, the transmission step 42 and the processing step 40 may be switched so that transmission occurs first, and then processing occurs on the server 18.

At block/step 44, the system 10 may determine which mode to operate in: enrollment of a new user, verification of an identified user, or identification of a user from the enrolled user's database. The user 12 may select what mode the system 10 is to operate in, or the mobile device 14 may be pre-set to operate in a certain mode. Alternatively, different external triggers may set the mode of the system 10 depending on specific pre-programmed conditions.

At block/step 46, the system 10 may operate in the enrollment mode. At this block/step 46, the system may save the fingerprint image 30 to the database 20. In another embodiment, the system 10 may prompt the user 12 to enter other identifying information into the mobile device 14 at this step. In another embodiment, the mobile device 14 may capture multiple images 30 of the user's finger 22 during enrollment and save the multiple images 30 to the database 20. These multiple images 30 may be taken under varying ambient conditions. These multiple images 30 may improve matching accuracy under various conditions. In another embodiment, the multiple images 30 may be compiled into one fingerprint image 30 that is a composite of the best portions of the separate multiple images 30.

At block/step 48, the system 10 may operate in the verification mode. At this block/step 48, the system 10 may be directed as to the identity of the user 12 that is to be verified, and the system 10 may compare the captured fingerprint image 30 with the fingerprint image 30 or images 30 previously captured and stored in the database 20 for that particular user 12. If the captured image 30 matches at least one of the existing images 30 stored in the database 20 for that particular user 12, the system 10 may return a positive-match result to the mobile device 14, thus allowing the user 12 access. If there is no match, the system 10 may prompt the user 12 to try to capture the fingerprint again. In other embodiments, the system 10 may disable the mobile device 14, either permanently or for a set time period, after a preset number of negative results and may optionally generate an alert.

At block/step 50, the system 10 may operate in the identification mode. At this block/step 50, the system 10 may not have been informed as to which previously-enrolled user 12 is attempting to be authenticated. Thus, the system 10 may compare the captured fingerprint image 30 with every fingerprint image 30 previously captured and stored in the database 20 for all users 12. If the captured image 30 matches at least one of the existing images 30 stored in the database 20, the system 10 returns a positive-match result to the mobile device 14 and allows the particular user 12 access. If there is no match, the system 10 may prompt the user 12 to try to capture the fingerprint again. In other embodiments, the system 10 may disable the mobile device 14, either permanently or for a set time period, after a preset number of negative results and may optionally generate an alert.

Figure 3:
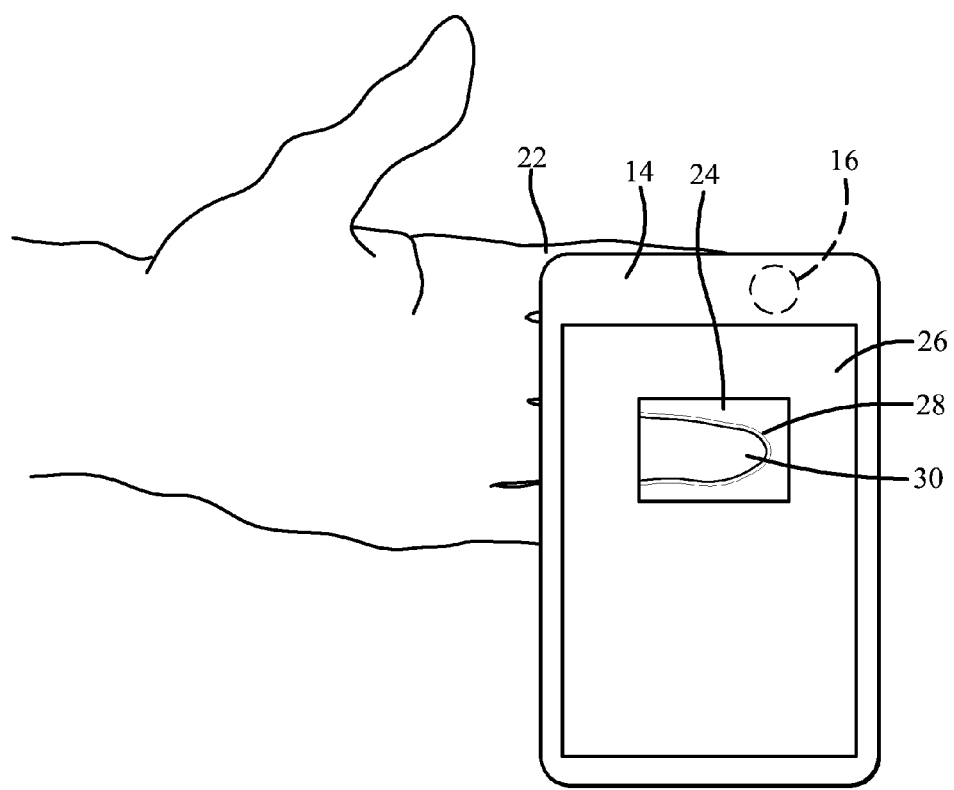
FIG. 3 is a front view of a mobile device capturing a user's fingerprint image.

FIG. 3 shows a mobile device 14 capturing an image 30 of a user's finger 22 by a camera 16 located on the rear of the device 14. The camera 16 may be located on the front, rear, or side of the device 14. The camera 16 may be a CMOS or CCD camera. The camera may have a resolution of at least two megapixels in another embodiment. The mobile device 14 may include a display screen 26. In another embodiment, the device 14 may display a preview window 24 on the screen 26 during any or all of steps 34, 36, 38. In other embodiments of the invention, the preview window 24 may be located in the top third of the screen 26 or in the third of the screen 26 closest to the camera 16. The preview window 24 may display in real-time what the camera sees, which may be the user's finger 22. The preview window 24 may help the user 12 position the finger 22 within the camera's 16 field of view for capture.

In another embodiment, the preview window 24 may display an overlay guide 28. This overlay guide 28 may be a translucent or transparent object in the shape of a finger 22. This guide 28 may be positioned within the preview window 24 to show the ideal placement for a finger 22 for capture of a fingerprint image 30. The guide 28 may be of a shape and size to represent an average finger 22 placed at an appropriate distance from the camera 16 to have good depth of field. The preview window 24 may simultaneously display the overlay guide 28 and the actual finger 22 when the finger 22 is placed in front of the camera 16. In another embodiment of the invention, the mobile device 14 may mask or "black out" during step 38 everything in the camera 16 field of view that is outside the overlay guide 28. In another embodiment, processing of the fingerprint image 30 at step 40 may include cropping the portion of the image 30 that is outside the overlay guide 28.

Figure 4:
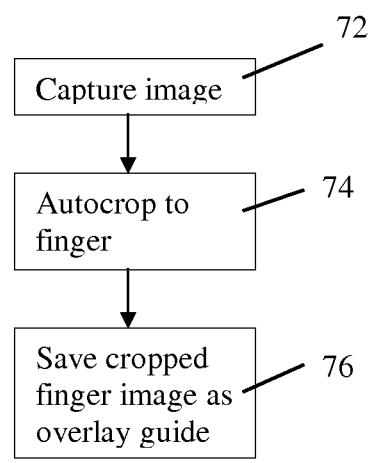
FIG. 4 is a flow chart of a method of creating an overlay guide from a user's finger image.

FIG. 4 shows a flow chart for a method of creating an overlay guide 28 from a user's finger image 30 in another embodiment of the invention. The steps of this method may take place during or in parallel with steps 38, 40, 42 of the biometric system 10 method. In another embodiment, the steps of FIG. 4 may take place in enrollment mode. At block/step 72, the camera 16 may capture an image 30 of the user's finger 22, just as in step 38.

At block/step 74, the captured image 30 may be processed by automatically cropping the portion of the image 30 that is outside the finger 22. After isolating the finger 22 in the image 30 and cropping the background, a customized overlay guide 28 may be created from the cropped finger image 30, and this customized overlay guide 28 may be saved to the mobile device 14 at block/step 76. This custom overlay guide 28 may aid the user 12 by indicating to the user 12 in the preview window 24 where to place or locate the finger 22 with respect to the camera 16 for a good capture. In other embodiments, this custom overlay guide 28 may be used in the same way as the generic, average-finger overlay guide 28 described previously with respect to FIG. 3, including, but not limited to, masking or "blacking out" during step 38 everything in the camera 16 field of view that is outside the custom overlay guide 28 and/or cropping the portion of the image 30 that is outside the custom overlay guide 28 during the processing step 40.

In another embodiment of the invention, the system 10 may return a negative match if a user 12 places a finger 22 at an angle different from that of the custom overlay guide 28; the underlying premise may be that a user 12 will generally fall in the habit of placing a finger 22 before the camera 16 at approximately the same angle each time, so if the finger 22 is placed at a different angle, an unauthorized person may be attempting to gain authentication. In another embodiment, the system 10 may analyze the captured fingerprint image 30 and compare it with stored images 30 in the database 20 to determine if the angle of the currently-captured fingerprint image 30 is different from the angle of stored images 30, and the system 10 may return a negative match if the angles are different.

Figure 5:
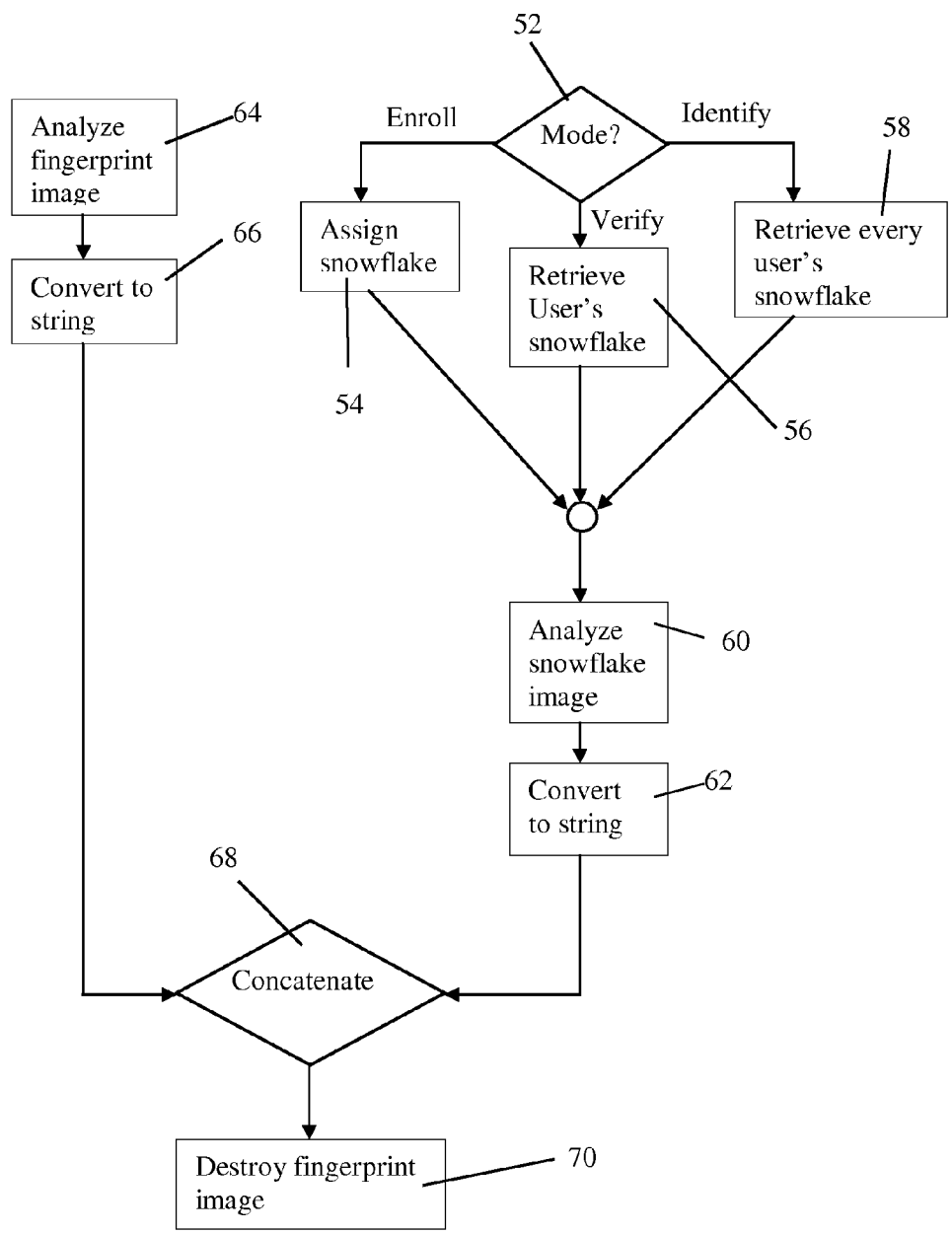
FIG. 5 is a flow chart of a method of concatenating a user's fingerprint image with a random image file in a biometric system.

FIG. 5 shows a flow chart for a method of concatenating a user's fingerprint image 30 with a random image file in a biometric system 10 according to another embodiment. The steps of this method may take place during or in parallel with step 40 of the biometric system 10 method. At block/step 64, the captured fingerprint image 30 of a user's finger 22 may be analyzed for significant geographical landmarks of the fingerprint. At block/step 66, these analyzed and extracted significant geographical landmarks may be converted to a string of data.

At block/step 52, the system 10 may determine in what mode to operate, as in step 44. If the system 10 is in enrollment mode, at block/step 54, the system 10 may assign a unique, randomly-generated image file to the particular user 12 being enrolled. If the system 10 is in verification mode, at block/step 56, the system 10 may retrieve from the database 20 the random image file previously assigned to the particular user 12 being verified. If the system 10 is in identification mode, at block/step 58, the system 10 may retrieve from the database 20 every random image file in the database 20 previously assigned to every user 12. The unique, randomly-generated image file may be of a snowflake in one embodiment; in alternative embodiments, other images may be used.

In another embodiment, the assigned random image file may be stored on the mobile device 14. Storing the assigned random image file locally on the mobile device 14 of the user 12 may help decrease the authentication time in identification mode if the enrolled profiles are stored in a remote database 20; otherwise, if both the assigned random image files and enrolled profiles are stored only in a remote database 20, the system 10 may need to go through many iterations or loops of the authentication process described below depending on how many users are enrolled in the database 20.

At block/step 60, the assigned random image file may be analyzed for significant geographical landmarks of the random image file. The analyzed random image file may be the one assigned to the new user 12 if in enrollment mode; the one assigned to the user 12 if in verification mode; or, if in identification mode, every one sequentially or iteratively that is in the database 20. At block/step 62, these analyzed and extracted significant geographical landmarks may be converted to a string of data.

At optional block/step 68, the string of fingerprint significant geographical landmarks may be concatenated with the string of significant geographical landmarks of the random image file. At block/step 70, the captured fingerprint image 30 may be destroyed and not saved. The data that is transmitted in step 42 may be the concatenated string from step 68. In such an embodiment, the fingerprint image is not saved in a database 20 for privacy reasons. During verification or identification, the concatenated string may be compared to the concatenated strings stored in the database 20 for a match.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

We claim:

1. A method for biometric authentication of a user comprising the steps of:
   a) providing:
      a mobile device comprising a camera and a screen;
      a database; and
      a randomly-generated image that is unique to each user using the mobile device;
   b) capturing with the camera an image of a fingerprint of the user;
   c) extracting first significant geographical areas of the fingerprint image;
   d) extracting second significant geographical areas of the randomly-generated image;
   e) concatenating the first significant geographical areas with the second significant geographical areas to produce a concatenated string;
   f) comparing the concatenated string with an authenticated concatenated string that is stored in the database; and
   g) returning a positive result if the compared strings match.

2. The method of claim 1 further comprising step:
   h) discarding the fingerprint image.

3. The method of claim 2, wherein step a) further comprises providing a server external to the mobile device, wherein the server comprises the database; the method further comprising step:
   i) sending the concatenated string to the server;
   wherein step i) occurs after step e) and before step f).

4. The method of claim 3, wherein the randomly-generated image of the user is stored on that user's mobile device.

5. The method of claim 2, wherein the database is stored on the mobile device.

6. The method of claim 2 further comprising step:
   j) superimposing on the screen an overlay of a finger over a real-time image as currently seen through the camera;
   wherein step j) occurs after step a) and before step b).

7. The method of claim 2, wherein the comparing of step f) comprises performing standard deviation analysis.

8. The method of claim 2 further comprising step:
   k) the positive result in step g) causing at least one of the following group of actions:
      unlocking the mobile device;
      accessing an application on the mobile device; and
      authenticating a mobile payment system.

9. The method of claim 2, wherein the database provided in step a) includes authenticated concatenated strings for a plurality of users using the mobile device;
   wherein step a) further comprises providing a plurality of randomly-generated images, each of which is unique to each of the plurality of users using the mobile device;
   wherein step d) comprises extracting second significant geographical areas of each of a plurality of randomly-generated images in sequential iterations of steps d)-g);
   wherein step e) comprises concatenating the first significant geographical areas with the second significant geographical areas of each of a plurality of randomly-generated images in sequential iterations of steps d)-g) to produce a new concatenated string in each iteration;
   wherein step f) comprises comparing the concatenated string of each iteration of steps d)-g) with the authenticated concatenated strings that are stored in the database; and
   wherein step g) further comprises identifying the user for who the compared strings match.

* * * * *